(12) United States Patent
Plona

(10) Patent No.: US 11,867,236 B2
(45) Date of Patent: Jan. 9, 2024

(54) DEVICE FOR DAMPING A ROLLING BEARING, COMPRISING A RIGID SUPPORT PASSING THROUGH A FLEXIBLE CAGE

(71) Applicant: SAFRAN AIRCRAFT ENGINES, Paris (FR)

(72) Inventor: Daniel Georges Plona, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 85 days.

(21) Appl. No.: 17/624,097

(22) PCT Filed: Jun. 16, 2020

(86) PCT No.: PCT/FR2020/051030
§ 371 (c)(1),
(2) Date: Dec. 30, 2021

(87) PCT Pub. No.: WO2021/001610
PCT Pub. Date: Jan. 7, 2021

(65) Prior Publication Data
US 2022/0356906 A1 Nov. 10, 2022

(30) Foreign Application Priority Data
Jul. 2, 2019 (FR) ..................................... 19 07306

(51) Int. Cl.
*F16C 35/077* (2006.01)
*F16C 27/04* (2006.01)
(Continued)

(52) U.S. Cl.
CPC .......... *F16C 35/077* (2013.01); *F01D 25/164* (2013.01); *F16C 27/045* (2013.01); *F16C 27/066* (2013.01)

(58) Field of Classification Search
CPC .... F16C 19/527; F16C 27/045; F16C 27/066; F16C 35/077; F16C 2360/23; F01D 25/164
See application file for complete search history.

(56) References Cited

U.S. PATENT DOCUMENTS 5,033,875 A * 7/1991 Moulinet .............. F16C 27/066
384/582
9,279,449 B2 * 3/2016 Rouesne ............... F16C 27/045
(Continued)

FOREIGN PATENT DOCUMENTS

| EP | 2 149 681 A2 | 2/2010 |
|---|---|---|
| EP | 2 538 036 B1 | 8/2018 |
| FR | 2 951 232 A1 | 4/2011 |

OTHER PUBLICATIONS

International Search Report dated Aug. 24, 2020 in PCT/FR2020/051030 filed Jun. 16, 2020, 2 pages.
(Continued)

*Primary Examiner* — James Pilkington
(74) *Attorney, Agent, or Firm* — Oblon, McClelland, Maier & Neustadt, L.L.P.

(57) ABSTRACT

A device for damping a rolling bearing includes a support and a radially flexible cage. The cage includes a ring provided in order to be mounted on the periphery of a rolling bearing. The radial flexibility of this cage results from the structure thereof which is perforated by oblique posts connecting the ring to an attachment annulus of this cage. The support includes a plurality of teeth each extending radially through a respective inter-post opening of the cage. The ring and the support form, radially between one another, a fluid damping cavity suitable for forming a compressed fluid film. The device allows a controlled radial movement of the ring, the latter being radially limited by the support, while having a limited footprint.

10 Claims, 3 Drawing Sheets

(51) Int. Cl.
*F01D 25/16* (2006.01)
*F16C 27/06* (2006.01)

(56) References Cited

U.S. PATENT DOCUMENTS

2008/0152483 A1 6/2008 Godleski
2010/0027930 A1 2/2010 Kinnaird et al.
2012/0213629 A1 8/2012 Rouesne

OTHER PUBLICATIONS

Preliminary French Search Report dated Feb. 24, 2020 in French Patent Application No. 1907306 filed Jul. 2, 2019, 2 pages (with Translation of Categories).

* cited by examiner

DEVICE FOR DAMPING A ROLLING BEARING, COMPRISING A RIGID SUPPORT PASSING THROUGH A FLEXIBLE CAGE

BACKGROUND

The invention relates to the field of rolling bearings for guiding a shaft such as an aircraft turbine engine shaft in rotation.

The invention relates in particular to the field of rolling bearings with compressed fluid film damping.

PRIOR ART

Compressed fluid film bearing damping is a well-known technique in the field of turbine engines and particularly in the aeronautical field.

The document EP 2 538 036 B1 describes a rolling bearing equipped with such a damping device. With reference to FIG. 2 of this document, this device comprises a cage 44 and a rigid support 64 forming radially therebetween a fluidic damping cavity 50 capable of forming a circumferential compressed fluid film. The cage 44 comprises a ring 48 mounted on the outer ring 52 of the bearing as well as stanchions 46 that are radially deformable so as to allow a radial movement of the ring 48 and therefore of the bearing with respect to the rigid support 64.

The damping devices known in the prior art are relatively bulky. For example, the document EP 2 538 036 B1 has an axial dimension almost three times greater than the axial dimension of the bearing.

SUMMARY

The aim of the present invention is to provide a device for damping a rolling bearing having both good damping performances and a limited size, so as to enable the integration thereof in a narrow space, for example inside an internal gear box of an accessory drive train of an aircraft propulsion assembly.

For this purpose, the invention relates to a device for damping a rolling bearing, this device comprising an annular support and a cage extending axially along an axis of revolution, this cage comprising:
a fastening ring,
a ring configured to be mounted on the periphery of the bearing or to form an outer ring of the bearing,
stanchions connecting the ring to the fastening ring, these stanchions extending obliquely with respect to said axis of revolution and being circumferentially spaced apart from one another such that, for each pair of circumferentially contiguous stanchions, these stanchions define an inter-stanchion opening therebetween.

The ring and the annular support form radially therebetween a fluidic damping cavity capable of forming a circumferential compressed fluid film.

According to the invention, the annular support comprises a plurality of teeth each extending radially through a respective inter-stanchion opening of the cage.

Such interlocking of the cage and the annular support makes it possible to reduce the size of the damping device with respect the damping devices known in the prior art. Indeed, the invention makes it possible to dispose all the parts of the annular support in the gaps of the cage, in this case the inter-stanchion gaps, such that the annular support has axial and/or radial dimensions identical to or less than the axial and/or radial dimensions of the cage, the axial dimension of the cage and in particular of the ring optionally being substantially identical to that of the bearing.

In the present document, the term "oblique" denotes a non-parallel and non-perpendicular orientation with respect to a reference direction or axis. Thus, the stanchions extend both axially and radially with respect to said axis of revolution.

Preferably, each stanchion of the cage can comprise a first end connected to a first axial end of the ring and a second end connected to the fastening ring and located axially next to a second axial end of the ring.

In an embodiment, the annular support can comprise a crown gear and a fastening part, the crown gear bearing said teeth and delimiting said fluidic damping cavity, the fastening part being fastened to the crown gear.

In an embodiment, the fastening part of the annular support can bear against the fastening ring of the cage.

This makes it possible to connect the cage and the annular support to a frame using common fastening means and, moreover, to reduce the radial size of the device.

In an embodiment, the fastening part of the annular support can comprise tabs each bearing against a respective tooth of the crown gear.

In an embodiment, the ring can comprise a radially outer face comprising two circumferential grooves axially spaced apart from one another, this radially outer face comprising a fluidic contact portion delimited axially by the two circumferential grooves and two bearing portions each being delimited axially by one of these circumferential grooves. The annular support can comprise a radially inner face having two axial ends respectively bearing on said bearing portions of the radially outer face of the ring, this radially inner face comprising a fluidic contact portion axially between the bearing portions of this face. Said fluidic damping cavity can be delimited radially by the respective fluidic contact portions of the ring and the annular support, and axially by said circumferential grooves of the ring.

The invention also relates to a bearing comprising a device as defined above.

According to a first alternative embodiment, this bearing can comprise a ball or roller bearing, the ring of the cage being configured to be mounted on an outer ring of this bearing.

According to a second alternative embodiment, this bearing can comprise an inner ring and rolling elements such as balls or rollers, the ring of the cage forming an outer ring establishing a bearing with the inner ring and the rolling elements.

The invention also relates to a turbine engine.

Preferably, this turbine engine is an aircraft turbine engine, optionally comprising an accessory drive train, this accessory drive train comprising a device for drawing power from a shaft of the turbine engine, this device for drawing power comprising a bearing as defined above.

The invention also relates to a method for assembling a device as defined above, according to an embodiment wherein the annular support comprises a crown gear and a fastening part, this method comprising:
a step of interlocking the crown gear on the ring by axial translation of the crown gear with respect to the ring so as to insert each tooth of the crown gear into a respective inter-stanchion opening of the cage;
a step of fastening the fastening part to the crown gear.

Further advantages and features of the invention will emerge on reading the following non-limiting detailed description.

BRIEF DESCRIPTION OF THE DRAWINGS

The following detailed description refers to the appended drawings wherein.

DETAILED DESCRIPTION OF EMBODIMENTS

Figure 1:
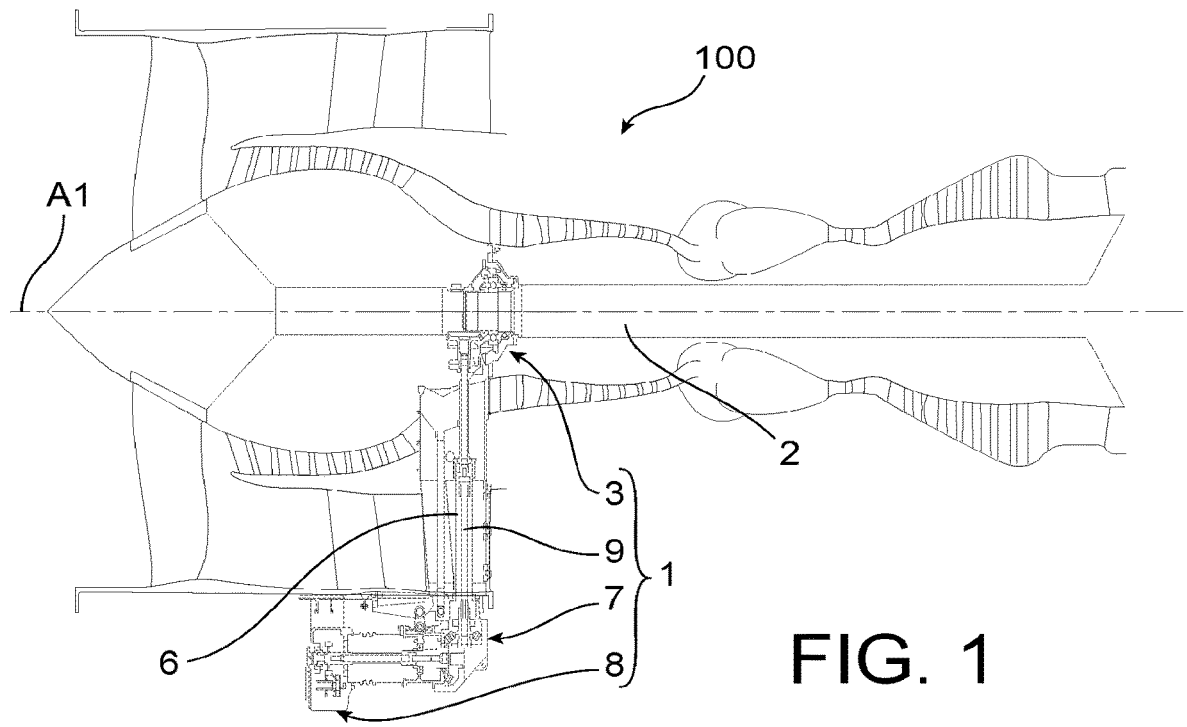
FIG. 1 is a schematic axial cross-sectional view of a dual-flow turbojet engine comprising an accessory drive train.

FIG. 1 shows a conventional dual-flow, double-body turbojet engine 100.

The turbojet engine 100 comprising an accessory drive train (ADT) 1.

Figure 2:
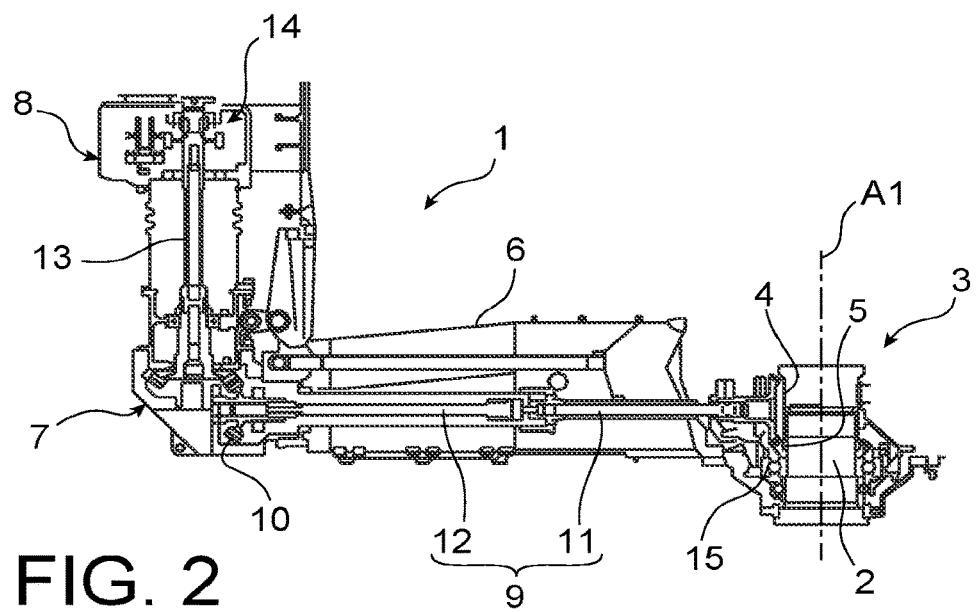
FIG. 2 is a schematic axial cross-sectional view of an accessory drive train for an aircraft turbine engine, this system comprising an internal gear box equipped with a rolling bearing to guide a shaft of the turbine engine in rotation.

An accessory drive train 1 is represented separately in FIG. 2.

In a manner known per se, a portion of the energy generated by the turbojet engine 100 is drawn to power various accessories powering this turbojet engine as well as aircraft equipment.

This drawing is generally performed mechanically on a high-pressure body shaft 2 of the turbojet engine.

For this purpose, the accessory drive train 1 typically includes an internal gear box 3. This gear box 3 houses a gear 4 driven by a pinion 5 rigidly connected to the shaft 2 of the turbojet engine, and thus forms a device for drawing power.

Typically, the accessory drive train 1 comprises gear boxes 7 and 8 as well as a transmission mechanism configured to transmit the mechanical energy thus drawn to the accessories and equipment.

The transmission mechanism comprises a shaft 9 connecting the gear 4 of the internal gear box 3 to a conical couple 10 housed in the gear box 7 so as to drive the pinions of this conical couple 10 in rotation about the respective axis thereof. The gear box 7 forms a transfer gear box.

The shaft 9 is in this example made of two portions 11 and 12 which extend in an arm 6 of an intermediate casing of the turbojet engine intended to extend through the secondary jet of the turbojet engine.

The transmission mechanism also comprises a shaft 13 connecting the conical couple 10 to a gear 14 housed in the gear bow 8 which forms an accessory gear box (AGB). In this example, the shaft 13 extends parallel with the longitudinal axis A1 of the turbojet engine 100.

The accessory gear box 8 usually holds various accessories, for example a generator, a starter, an alternator, a hydraulic pump, an engine lubrication unit, etc. Such accessories can thus be driven by the gear 14 to which the mechanical power drawn from the shaft 2 of the turbojet engine 100 is transmitted.

The guiding in rotation of the high-pressure body shaft 2, about the axis A1, is typically performed by a rolling bearing 15 housed in the internal gear box 3 (see FIG. 2).

Figure 3:
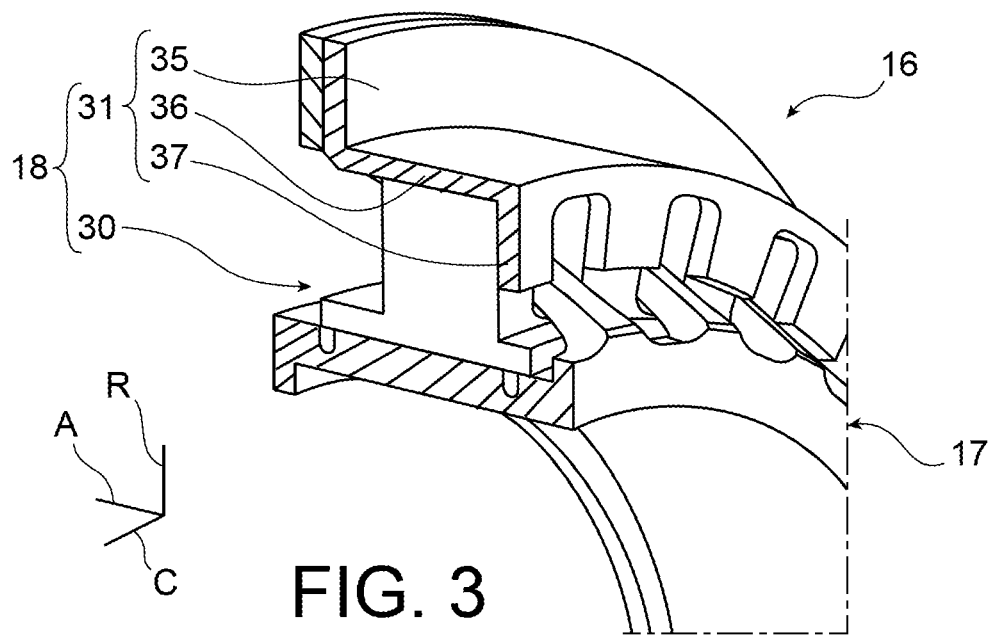
FIG. 3 is a schematic partial perspective view of a device for damping a rolling bearing according to a first embodiment according to the invention, this device comprising a cage and an annular support including a crown gear and a fastening part, the cage being configured to be mounted on an outer ring of the bearing.
Figure 6:
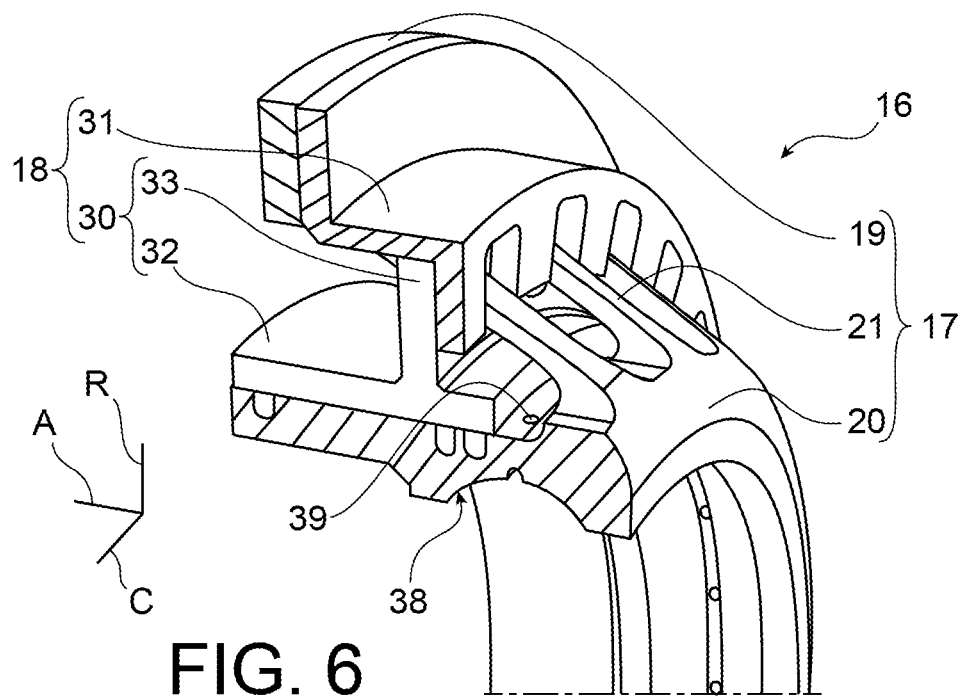
FIG. 6 is a schematic partial perspective view of a device for damping a rolling bearing according to a second embodiment according to the invention, this device comprising a cage and an annular support including a crown gear and a fastening part, the cage forming an outer ring of the bearing.

The invention relates to a damping device 16 of such a rolling bearing 15, two embodiments of which are given as examples in FIGS. 3 and 6. Obviously, the damping device 16 according to the invention can be used in other rotary machines or for damping any other turbine engine rolling bearing.

In each of FIGS. 3 to 6, an orthogonal reference indicates the axial A, radial R and circumferential C directions.

In these figures, only a circumferential segment of each of the parts is represented, it being understood that each of these parts extends circumferentially about an axis of revolution so as to form an annular part.

By convention, the parts of the device 16 located to the left of FIGS. 3 to 6 along the axial direction A form upstream parts whereas those located to the right of these figures along the axial direction A form downstream parts.

When the damping device 16 is mounted on the rolling bearing 15 of the accessory drive train 1 in FIG. 2, this axis of revolution coincides with the longitudinal axis A1 along which the shaft 2 extends.

Figure 4:
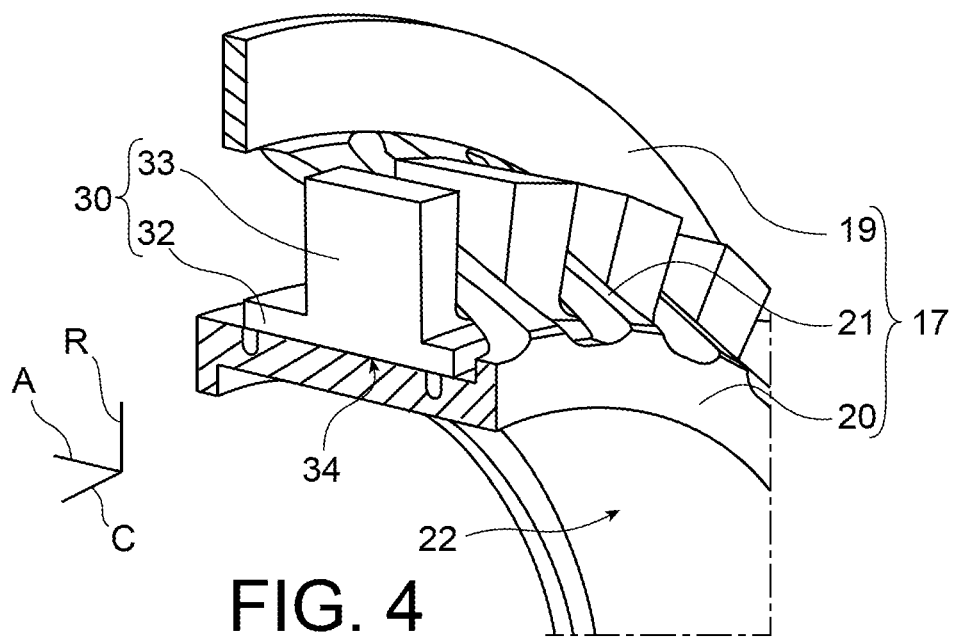
FIG. 4 is a schematic partial perspective view of the cage and the crown gear of the device in FIG. 3.
Figure 5:
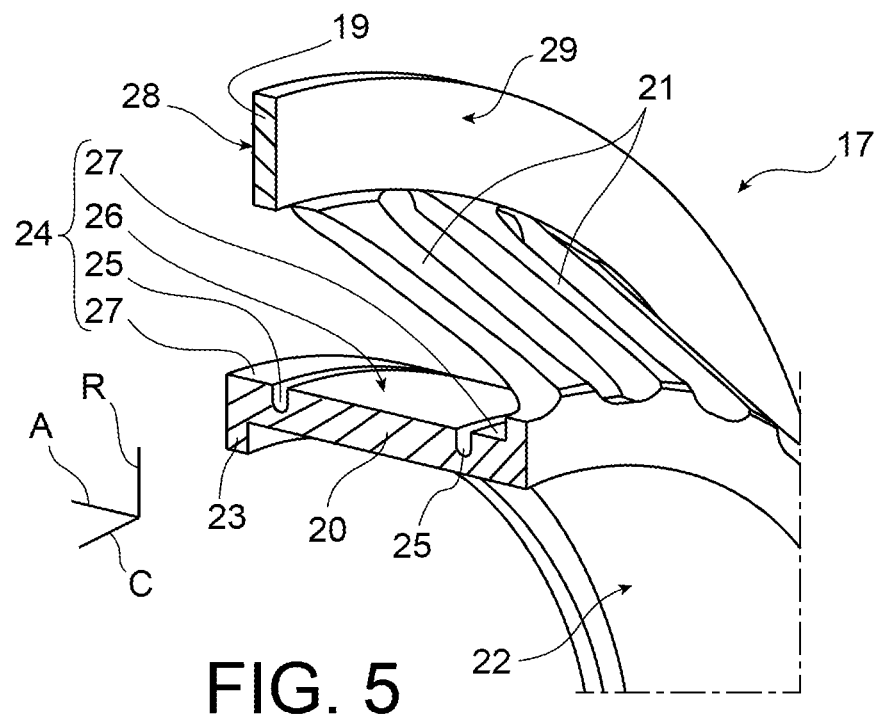
FIG. 5 is a schematic partial perspective view of the cage of the device in FIG. 3.

A first embodiment illustrated in FIGS. 3 to 5 is first described hereinafter.

The damping device 16 comprises a cage 17 and an annular support 18.

With reference to FIG. 5, the cage 17 comprises a fastening ring 19, a ring 20 and stanchions 21.

In this embodiment, the ring 20 is configured to be mounted on an outer ring of a bearing, for example the bearing of the main bearing 15 in FIG. 2.

To this end, the ring 20 comprises a radially inner face 22 configured to mould the radially outer face of said outer ring of the bearing.

In order to limit the axial movement of the outer ring of the bearing with respect to the ring 20, the latter preferably comprises axial stops arranged at two axial ends of this ring 20.

In the example in FIG. 5, the ring 20 comprises at the upstream axial end thereof a shoulder 23 forming an upstream axial stop for the outer ring of the bearing. This upstream axial stop 23 makes it possible to limit an axial movement of the outer ring of the bearing with respect to the ring 20 in a first direction from downstream to upstream along the axial direction A.

To limit an axial movement of the outer ring of the bearing with respect to the ring 20 in a second direction opposite said first direction, i.e. from upstream to downstream, the damping device 16 comprises for example a retaining ring (not shown) fastened to the radially inner face 22 of the ring 20 at the downstream axial end thereof.

The shoulder 23 and the retaining ring thus make it possible to axially clamp the outer ring of the bearing so as to secure this outer bearing ring to the ring 20 of the cage 17.

The outer ring of the bearing can be secured to the ring 20 of the cage 17 by other means. For example, in an embodiment not shown, an additional retaining ring can be fastened to the radially inner face 22 of the ring 20 at the upstream axial end thereof, instead of the shoulder 23. For another example, a shoulder can be produced on the ring 20 at the downstream end thereof and a retaining ring can be fastened to the ring 20 at the upstream end thereof.

Moreover, the retaining ring(s) can be fastened by any conventional means, for example using screws passing through the retaining ring(s) and received in corresponding threaded holes of the ring 20, and/or by engaging an outer thread of the retaining ring(s) with an inner thread of the ring 20 (embodiments not shown).

Radially opposite the inner face 22, the ring 20 comprises a radially outer face 24 comprising two circumferential grooves 25 axially spaced apart from one another.

This radially outer face 24 comprises a fluidic contact portion 26 delimited axially by the two circumferential grooves 25 and two bearing portions 27 each being delimited axially by one of these circumferential grooves 25. The bearing portions 27 are therefore located at the upstream and downstream axial ends, respectively, of the ring 20.

The fluidic contact portion 26 is intended to delimit a fluidic damping cavity (see further below).

As regards the fastening ring 19 of the cage 17, it has an internal diameter greater than the outer diameter of the ring 20, such that the fastening ring 19 extends radially outside the ring 20 and at a distance therefrom. This difference in diameter is particularly determined according to the sought radial deformation range of the stanchions 21 (see further below).

The fastening ring 19 of the cage 17 comprises an axially upstream face 28 and an axially downstream face 29 defining a thickness of this ring 19. The axially upstream 28 and downstream 29 faces are each substantially parallel with the radial direction R such that this ring 19 can be pressed by the axially upstream face 28 thereof against a face of a frame substantially perpendicular to the axis of revolution of the cage 17. The cage 17 can thus be fastened to such a frame by any conventional means, for example using screws (see further below).

In this example, the fastening ring 19 of the cage 17 is located next to the upstream axial end of the ring 20.

The fastening ring 19 is connected to the ring 20 by the stanchions 21. In this example, each stanchion 21 comprises for this purpose a first end connected to the downstream axial end of the ring 20 and a second end connected to the fastening ring 19. Given the relative radial position of the fastening ring 19 and of the ring 20, the stanchions 21 each extend both axially and radially, i.e. obliquely with respect to the axis of revolution of the cage 17.

The stanchions 21 are circumferentially spaced in relation to one another such that, for each pair of circumferentially contiguous stanchions 21, the latter define an inter-stanchion opening therebetween.

The cage 17 is thus perforated by the inter-stanchion openings, which gives the cage a certain radial flexibility. In a manner known per se, the stanchions 21 are indeed designed to be radially deformed under the action of a predetermined radial force so as to allow a radial movement of the ring 20 with respect to the fastening ring 19. This radial movement is here limited radially outwards by the annular support 18 (see below).

With reference to FIGS. 3 and 4, the annular support 18 comprises a crown gear 30 and a fastening part 31.

The crown gear 30 comprises an annular base 32 bearing a plurality of teeth 33 which each extend radially through a respective inter-stanchion opening of the cage 17 (see FIG. 4).

The annular base 32 of this crown gear 30 comprises a radially inner face 34 having two axial ends respectively bearing on said bearing portions 27 of the radially outer face 24 of the ring 20.

The radially inner face 34 of the crown gear 30 comprises a fluidic contact portion axially between the bearing portions of this face 34.

When the cage 17 and the annular support 18 are assembled with one another, said fluidic damping cavity is delimited radially on one hand by the fluidic contact portion 26 defined by the radially outer face 24 of the ring 20 of the cage 17 and, on the other, by the fluidic contact portion 34 defined by the radially inner face 34 of the crown gear 30 of the annular support 18. Axially, this fluidic damping cavity is delimited by the circumferential grooves 25 formed in the ring 20 of the cage 17.

Thus, the cage 17 and the annular support 18 form radially therebetween a fluidic damping cavity capable of forming a circumferential compressed fluid film, this fluid being typically oil.

The oil is conveyed into the fluidic damping cavity by any conventional means, for example using one or more channels and/or ports formed in the annular support 18, in particular in the crown gear 30 and/or in the fastening part 31 of this annular support 18.

In this example, the ring 20 of the cage 17 is machined such that the diameter of the outer face 24 thereof at the fluidic contact portion 26 is less than the diameter of this outer face 24 at the bearing portions 27, in order to define a thickness of the compressed fluid film. Typically, the difference between these diameters can be between 0.15 mm and 0.4 mm.

Obviously, the embodiment described above is in no way restrictive, the fluidic damping cavity optionally having a different geometry, provided that it is formed radially between the ring 20 of the cage 17 and the annular support 18.

With reference to FIG. 4, the crown gear 30 is moreover designed such that the radial dimension thereof is less than or substantially less than said difference between the internal diameter of the fastening ring 19 of the cage 17 and the external diameter of the ring 20 of this cage 17. Indeed, as is inferred from the assembly method described hereinafter, the crown gear 30 must be capable of being inserted into the cage 17 by relative axial translation of these parts by passing the crown gear 30 radially between the fastening ring 19 and the ring 20.

The fastening part 31 of the annular support 18 fulfils in this example a dual function of axial holding and of limiting the radial movement of the crown gear 30 with respect to the frame.

With reference to FIG. 3, the fastening part 31 comprises in this example three upstream 35, intermediate 36 and downstream 37 parts forming an "S" in a transverse sectional plane.

The upstream part 35 is a fastening part bearing against said axially downstream face 29 of the fastening ring 19 of the cage 17. The cage 17 and the fastening part 31 of the annular support 18 can thus be fastened to said frame using common fastening means such as screws.

The intermediate part 36 of the fastening part 31 forms a radial stop for the ring 20 of the cage 17. Indeed, the fastening part 31 and the crown gear 30 are fastened to one another such that these parts are rigidly connected to one another radially, axially and circumferentially (see hereinafter for the fastening means). In this example, the fastening part 31 and the crown gear 30 are fastened to one another in a position wherein a radially outer face of the teeth 33 of the crown gear 30 bears against a radially inner face of the intermediate part 36 of the fastening part 31.

The downstream part 37 comprises in this example tabs which each bear against a downstream face of a respective tooth 33 of the crown gear 30. Preferably, screws (not shown) are used to fasten the tabs 37 against the teeth 33.

The annular support 18 thus forms a radial stop limiting the movement of the cage 17 radially outwards and enabling the oil supply of the bearing and in particular of the fluidic damping cavity.

The assembly of such a damping device 16 particularly comprises a step of interlocking the crown gear 30 on the ring 20 of the cage 17 by axial translation of this crown gear 30 with respect to the ring 20 so as to insert each tooth 33 of the crown gear 30 into a respective inter-stanchion opening of the cage 17.

After positioning the crown gear 30 and the ring 20 according to the configuration illustrated in FIG. 4, a step of fastening the fastening part 31 and the crown gear 30 to one another is carried out.

The following description relates to the second embodiment illustrated in FIG. 6. This description is restricted to the differences between the first and the second embodiment.

In the example in FIG. 6, the ring 20 of the cage 17 directly forms the outer ring of the bearing equipping the damping device 16.

For this purpose, the ring 20 forms a raceway 38 for the ball bearing.

In this example, the raceway 38 is located at one downstream axial end of the cage 17, and more specifically downstream with respect to the fluidic damping cavity.

Among other advantages, this configuration particularly makes it possible to enhance the drainage of the space wherein the balls moves, via draining ports 39 which open downstream from the crown gear 30.

Obviously, the invention is not limited to the specific examples described above. For example, the ring 20 of the damping device 16 can be configured to be mounted on the periphery of a roller bearing or to form an outer ring of such a bearing.

The invention claimed is:

1. A device for damping a rolling bearing, the device comprising:
   an annular support; and
   a cage extending axially along an axis of revolution, the cage comprising:
   a fastening ring,
   a ring configured to be mounted on the periphery of the bearing or to form an outer ring of the bearing,
   stanchions connecting the ring to the fastening ring, the stanchions extending obliquely with respect to said axis of revolution and being circumferentially spaced apart from one another such that, for each pair of circumferentially contiguous stanchions, the stanchions define an inter-stanchion opening therebetween,
   the ring and the annular support forming radially therebetween a fluidic damping cavity capable of forming a circumferential compressed fluid film,
   wherein the annular support comprises a plurality of teeth each extending radially through a respective inter-stanchion opening of the cage.

2. The device according to claim 1, wherein each stanchion of the cage comprises a first end connected to a first axial end of the ring and a second end connected to the fastening ring and located axially next to a second axial end of the ring.

3. The device according to claim 1, wherein the ring comprises a radially outer face comprising two circumferential grooves axially spaced apart from one another, the radially outer face comprising a fluidic contact portion delimited axially by the two circumferential grooves and two bearing portions each being delimited axially by one of the circumferential grooves, and wherein the annular support comprises a radially inner face having two axial ends respectively bearing on said bearing portions of the radially outer face of the ring, the radially inner face comprising a fluidic contact portion axially between the bearing portions of the radially outer face, said fluidic damping cavity being delimited radially by the respective fluidic contact portions of the ring and of the annular support, and axially by said circumferential grooves of the ring.

4. The device according to claim 1, wherein the annular support comprises a crown gear and a fastening part, the crown gear bearing said teeth and delimiting said fluidic damping cavity, the fastening part being fastened to the crown gear.

5. The device according to claim 4, wherein the fastening part of the annular support bears against the fastening ring of the cage.

6. The device according to claim 4, wherein the fastening part of the annular support comprises tabs each bearing against a respective tooth of the crown gear.

7. A method for assembling a device according to claim 4, the method comprising:
   a step of interlocking the crown gear on the ring by axial translation of the crown gear with respect to the ring so as to insert each tooth of the crown gear into a respective inter-stanchion opening of the cage;
   a step of fastening the fastening part to the crown gear.

8. A bearing comprising a device according to claim 1, an inner ring, and rolling elements, the ring of the cage forming an outer ring establishing a bearing with the inner ring and the rolling elements.

9. A bearing comprising a device according to claim 1 and a ball or roller bearing, the ring of the cage being configured to be mounted on an outer ring of the ball or roller bearing.

10. An aircraft turbine engine, comprising an accessory drive train comprising a device for drawing power from a shaft of the turbine engine, the device for drawing power comprising a bearing according to claim 9.

* * * * *